United States Patent
Cao

(10) Patent No.: US 6,301,048 B1
(45) Date of Patent: Oct. 9, 2001

(54) TUNABLE CHROMATIC DISPERSION AND DISPERSION SLOPE COMPENSATOR UTILIZING A VIRTUALLY IMAGED PHASED ARRAY

(75) Inventor: Simon X. F. Cao, Pleasanton, CA (US)

(73) Assignee: Avanex Corporation, Fremont, CA (US)

( * ) Notice: Subject to any disclaimer, the term of this patent is extended or adjusted under 35 U.S.C. 154(b) by 0 days.

(21) Appl. No.: 09/574,531

(22) Filed: May 19, 2000

(51) Int. Cl.[7] .............................. G02B 27/00; G02B 5/18; G02B 23/04; G02B 27/10; G02B 27/42

(52) U.S. Cl. .................... 359/566; 359/558; 359/577; 359/578; 359/615; 359/629; 359/633

(58) Field of Search ..................... 359/566, 558, 359/577, 578, 579, 615, 629, 633, 857, 861

(56) References Cited

U.S. PATENT DOCUMENTS

| | | |
|---|---|---|
| 5,930,045 | 7/1999 | Shirasaki . |
| 5,969,865 | 10/1999 | Shirasaki . |
| 5,969,866 | 10/1999 | Shirasaki . |
| 5,973,838 | 10/1999 | Shirasaki . |
| 5,999,320 | 12/1999 | Shirasaki . |
| 6,028,706 | 2/2000 | Shirasaki et al. . |
| 6,169,630 * | 2/2001 | Shirasaki et al. ............. 359/577 |

* cited by examiner

Primary Examiner—Jon Henry
(74) Attorney, Agent, or Firm—Sawyer Law Group LLP

(57) ABSTRACT

The present invention provides a method and system for dispersion compensation for a composite optical signal in an optical fiber transmission system. The composite optical signal includes a plurality of channels, each of the plurality of channels includes a band of wavelengths, where the bands of wavelengths have unwanted dispersion and dispersion slope. The present invention includes propagating the composite optical signal in a forward direction; separating the wavelengths in the band of wavelengths in each of the plurality of channels, where the each of the wavelengths in the band is spatially distinguishable from the other wavelengths in the band; spatially separating each band of wavelengths in the plurality of channels; and reflecting the spatially separated bands of wavelengths toward a return direction, where dispersion is added to the reflected bands of wavelengths such that the unwanted dispersion and dispersion slope are compensated. The dispersion compensator in accordance with the present invention utilizes a Virtually Imaged Phased Array (VIPA) and diffraction gratings. The compensator provides simultaneous tunable compensation of dispersion and dispersion slope utilizing a single apparatus. A system which utilizes the compensator is thus cost effective to manufacture.

33 Claims, 11 Drawing Sheets

Top View

Side View

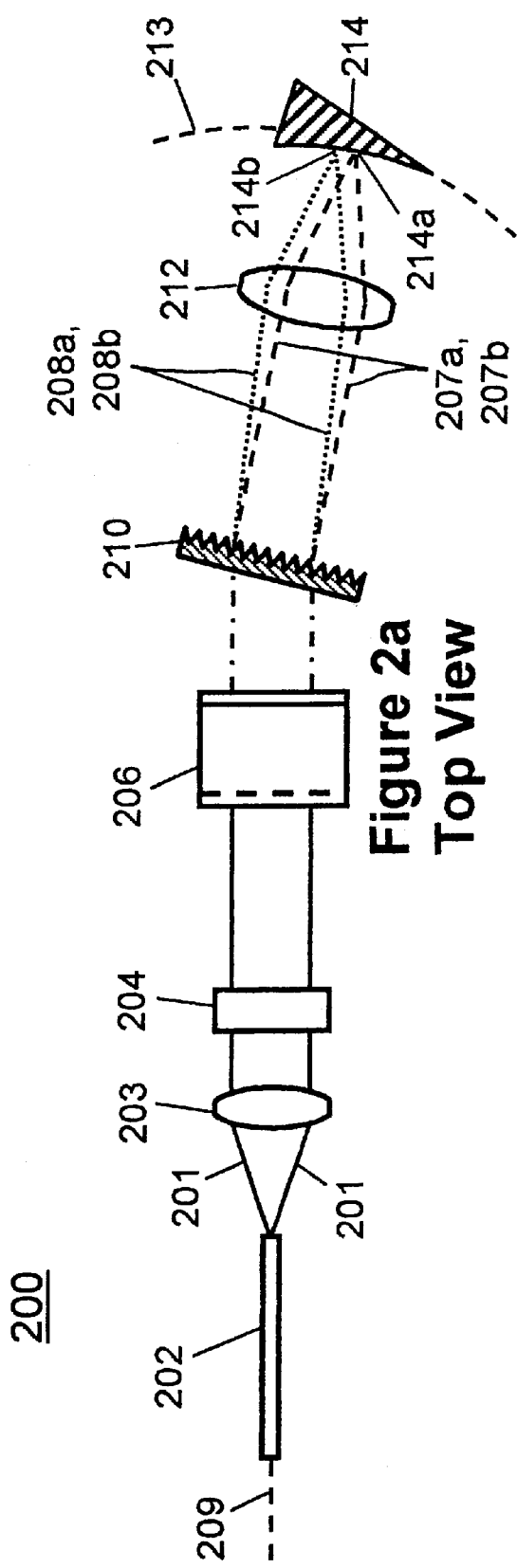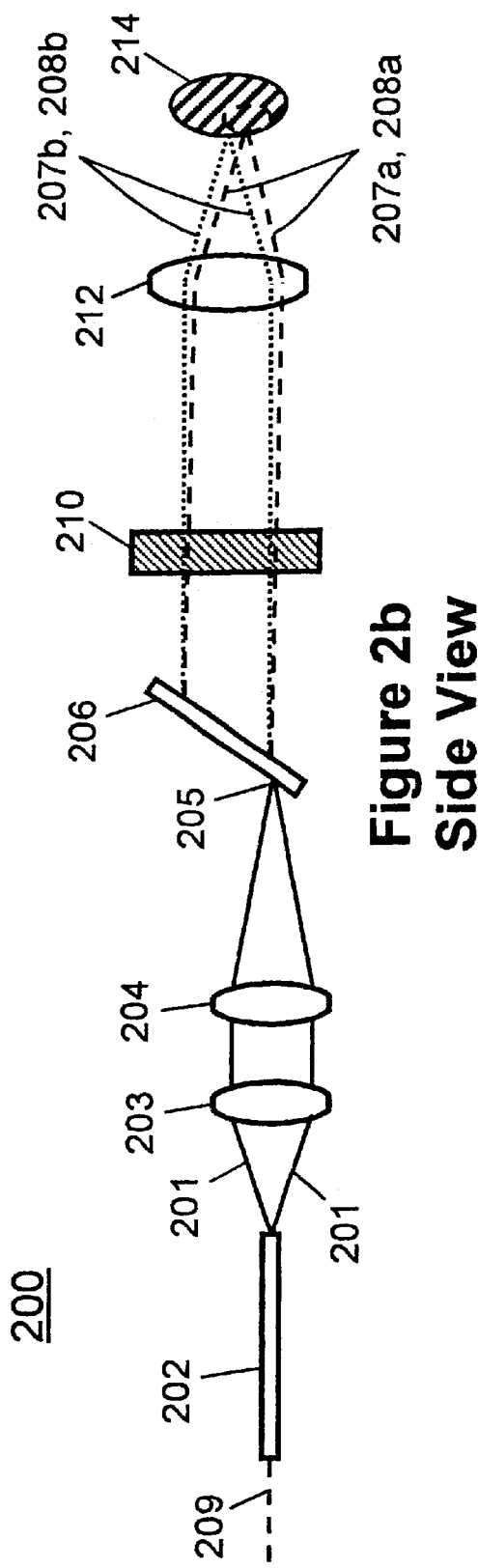

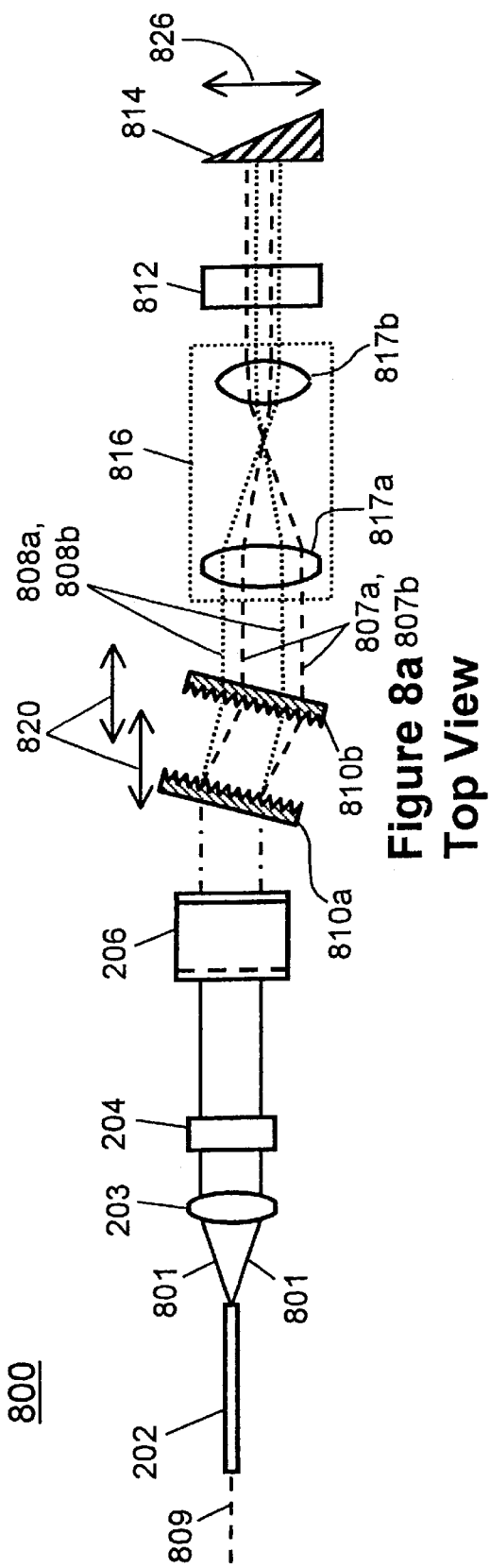
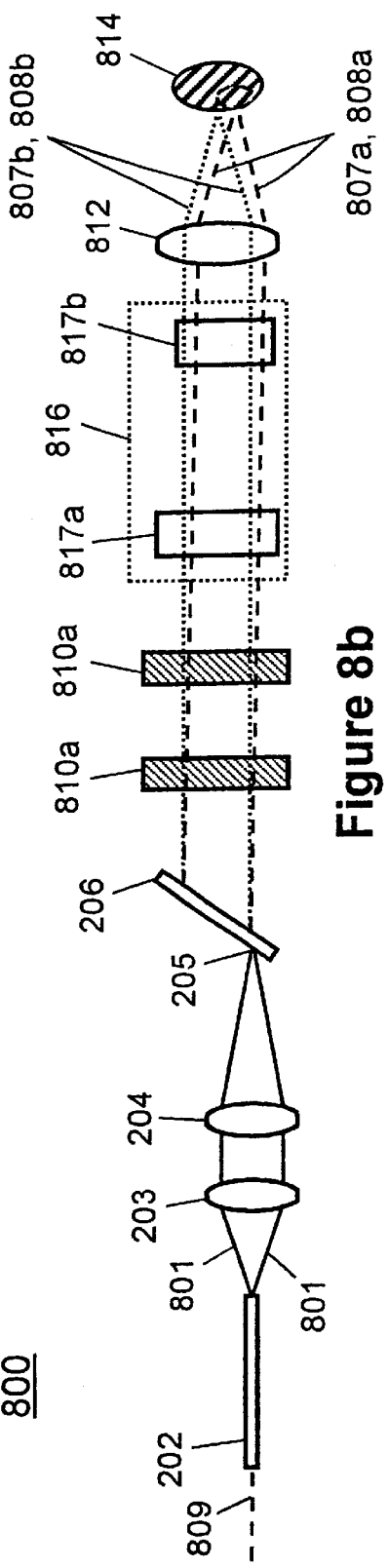
Figure 8a Top View
Figure 8b Side View

TUNABLE CHROMATIC DISPERSION AND DISPERSION SLOPE COMPENSATOR UTILIZING A VIRTUALLY IMAGED PHASED ARRAY

FIELD OF THE INVENTION

The present invention relates to chromatic dispersion and dispersion slope compensation, and more particularly to chromatic and dispersion slope compensation accumulated in a wavelength division multiplexed optical fiber transmission line.

BACKGROUND OF THE INVENTION

Fiber optic networks are becoming increasingly popular for data transmission because of their high speed and high capacity capabilities. Wavelength division multiplexing is used in such fiber optic communication systems to transfer a relatively large amount of data at a high speed. In wavelength division multiplexing, multiple information-carrying signals, each signal comprising light of a specific restricted wavelength range, may be transmitted along the same optical fiber.

In this specification, these individual information-carrying lights are referred to as either "signals" or "channels." The totality of multiple combined signals in a wavelength-division multiplexed optical fiber, optical line or optical system, wherein each signal is of a different wavelength range, is herein referred to as a "composite optical signal."

The term "wavelength" is used herein in two senses. In its first usage, this term is used according to its common meaning to refer to the actual physical length comprising one full period of electromagnetic oscillation of a light ray or light beam. In its second usage, the term "wavelength" is used synonymously with the terms "signal" or "channel." Although each information-carrying channel actually comprises light of a certain restricted range of physical wavelengths, for simplicity, a single channel is referred to as a single wavelength and a plurality of such channels are referred to as "wavelengths". Used in this sense, the term "wavelength" may be understood to refer to "the channel nominally comprised of light of a range of physical wavelengths centered at a particular nominal wavelength."

One common and well-known problem in the transmission of optical signals is chromatic dispersion of the optical signal. Chromatic dispersion refers to the effect wherein the channels comprising an optical signal travel through an optic fiber at different speeds, e.g., longer wavelengths travel faster than shorter wavelengths. This is a particular problem that becomes more acute for data transmission speeds higher than 2.5 gigabytes per second. The resulting pulses of the signal will be stretched, will possibly overlap, and will cause increased difficulty for optical receivers to distinguish where one pulse begins and another ends. This effect seriously compromises the integrity of the signal. Therefore, for a fiber optic communication system to provide a high transmission capacity, the system must compensate for chromatic dispersion. The exact value of the chromatic dispersion produced in a channel of a wavelength-division multiplexed fiber optic communications system depends upon several factors, including the type of fiber and the wavelength of the channel.

For dense wavelength division multiplexer (DWDM) systems or for WDM or DWDM systems with a wide wavelength spacing between the shortest and longest wavelength channels, the common approach is to allow chromatic dispersion to accumulate within spans of fiber and to compensate for dispersion at the ends of spans through the use of in-line dispersion compensators.

FIG. 1 is a graph illustrating the chromatic dispersion characteristics of some conventional optical fibers. The graphs in FIG. 1 represent the Group Velocity Dispersion, D, against wavelength for these conventional optical fibers. The quantity D (ps-km$^{-1}$-nm$^{-1}$) is defined by the relationship of the following equation:

$$D = \frac{d}{d\lambda}\left(\frac{1}{v_g}\right) = \frac{1}{L}\left(\frac{d\tau_g}{d\lambda}\right) \quad (1)$$

in which $\lambda$ is the channel wavelength (nm), $v_g$ is the group velocity (km/ps), $\tau_g$ is the group delay time (ps), and L is the fiber length (km). If $v_g$ decreases with increasing wavelength (i.e., longer or "red" wavelengths travel slower than relatively shorter or "blue" wavelengths) then D is positive, otherwise D is negative. Because all three fiber types illustrated in FIG. 1 are deployed in telecommunications systems, the requirements for dispersion compensators vary widely. Furthermore, because of the existence of non-zero dispersion slope, S, a constant level of dispersion compensation does not accurately negate the dispersion of all channels. This inaccuracy can become a significant problem for high-speed data propagation, long span distances, and/or wide distances between the shortest and longest wavelength channels.

Conventional dispersion compensators include dispersion compensation fiber, chirped fiber Bragg gratings coupled to optical circulators, and conventional diffraction gratings disposed as sequential pairs.

A dispersion compensation fiber, used in-line within a fiber communications system, has a special cross-section index profile so as to provide chromatic dispersion that is opposite to that of ordinary fiber within the system. The summation of the two opposite types of dispersion negates the chromatic dispersion of the system. However, dispersion compensation fiber is expensive to manufacture, has a relatively large optical attenuation, and must be relatively long to sufficiently compensate for chromatic dispersion.

A chirped fiber Bragg grating is a special fiber with spatially modulated refractive index that is designed so that longer (shorter) wavelength components are reflected at a farther distance along the chirped fiber Bragg grating than are the shorter (longer) wavelength components. A chirped fiber Bragg grating of this sort is generally coupled to a fiber communications system through an optical circulator. By causing certain wavelength components to travel longer distances than other wavelength components, a controlled delay is added to those components and opposite dispersion can be added to a pulse. However, a chirped fiber Bragg grating has a very narrow bandwidth for reflecting pulses, and therefore cannot provide a wavelength band sufficient to compensate for light including many wavelengths, such as a wavelength division multiplexed light. A number of chirped fiber Bragg gratings may be cascaded for wavelength multiplexed signals, but this results in an expensive system.

A conventional diffraction grating has the property of outputting different wavelengths at different angles. By using a pair of gratings in a coupled spatial arrangement, this property can be used to compensate chromatic dispersion in a fiber communications system. In such a spatial grating pair arrangement, lights of different wavelengths are diffracted from a first grating at different angles. These lights are then input to a second grating that diffracts them a second time so as to set their pathways parallel to one another. Because the different lights travel with different angles between the two gratings, certain wavelength components are made to travel longer distances than other wavelength components. Chromatic dispersion is produced in the spatial grating pair arrangement because the wavelength components that travel the longer distances incur time delays relative to those that travel the shorter distances. This grating-produced chromatic dispersion can be made to be opposite to that of the fiber communications system, thereby compensating the chromatic dispersion within the system. However, a practical spatial grating pair arrangement cannot provide a large enough dispersion to compensate for the relatively large amount of chromatic dispersion occurring in a fiber optic communication system. More specifically, the angular dispersion produced by a diffraction grating is usually extremely small, and is typically approximately 0.05 degrees/nm. Therefore, to compensate for chromatic dispersion occurring in a fiber optic communication system, the two gratings of a spatial grating pair would have to be separated by a very large distance, thereby making such a spatial grating pair arrangement impractical.

Accordingly, there exists a need for an improved chromatic dispersion compensator. The improved compensator should produce an adjustable chromatic dispersion and be readily adapted to provide either positive or negative chromatic dispersion, which can provide non-uniform dispersion compensation so as to compensate for fiber dispersion slope. The present invention addresses such a need.

SUMMARY OF THE INVENTION

The present invention provides a method and system for dispersion compensation for a composite optical signal in an optical fiber transmission system. The composite optical signal includes a plurality of channels, each of the plurality of channels includes a band of wavelengths, where the bands of wavelengths have unwanted dispersion and dispersion slope. The present invention includes propagating the composite optical signal in a forward direction; separating the wavelengths in the band of wavelengths in each of the plurality of channels, where the each of the wavelengths in the band is spatially distinguishable from the other wavelengths in the band; spatially separating each band of wavelengths in the plurality of channels; and reflecting the spatially separated bands of wavelengths toward a return direction, where dispersion is added to the reflected bands of wavelengths such that the unwanted dispersion and dispersion slope are compensated. The dispersion compensator in accordance with the present invention utilizes a Virtually Imaged Phased Array (VIPA) and diffraction gratings. The compensator provides simultaneous tunable compensation of dispersion and dispersion slope utilizing a single apparatus. A system which utilizes the compensator is thus cost effective to manufacture.

BRIEF DESCRIPTION OF THE FIGURES

FIGS. 2a and 2b illustrate a top view and a side view, respectively, of a first preferred embodiment of a chromatic dispersion and dispersion slope compensator in accordance with the present invention.

FIGS. 8a and 8b illustrate a top and side view, respectively, of a second preferred embodiment of the chromatic and dispersion slope compensator in accordance with the present invention.

DETAILED DESCRIPTION

Figure 1:
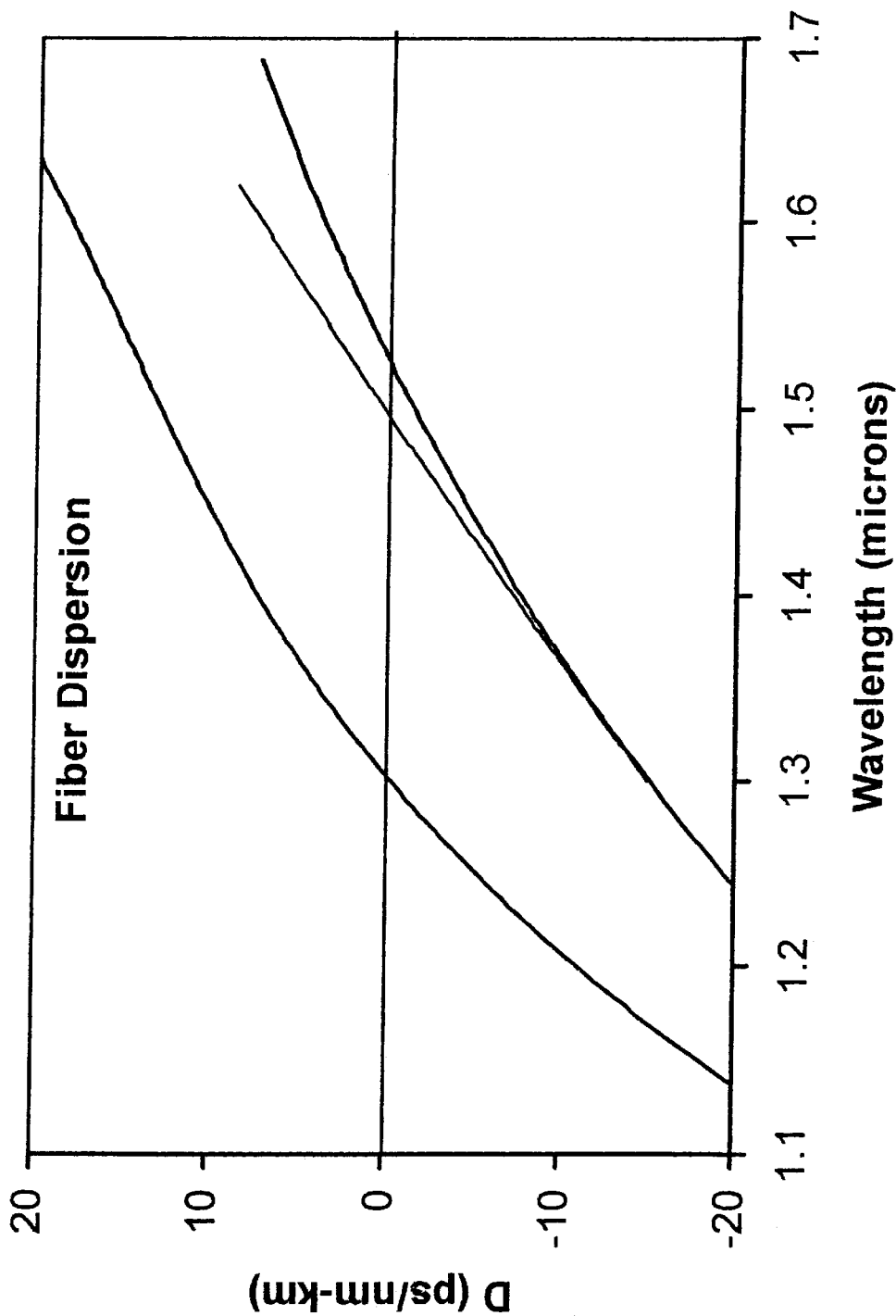
FIG. 1 is a graph illustrating the chromatic dispersion characteristics of some conventional optical fibers.

The present invention provides an improved chromatic dispersion and dispersion slope compensator. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The present invention provides a chromatic dispersion and dispersion slope compensator which comprises a virtually imaged phased array (VIPA). The VIPA is optically coupled on a first side to an optical communications system, and optically coupled on a second side to one or more transmission-type diffraction gratings and a mirror. The VIPA assists in producing chromatic dispersion compensation while the diffraction grating assists in producing dispersion slope compensation.

FIGS. 2a–2b illustrate a top view and side view, respectively, of a first preferred embodiment of a chromatic dispersion and dispersion slope compensator in accordance with the present invention. The compensator 200 comprises a plurality of optically coupled components, comprising a fiber 202, a collimator lens 203, a cylindrical lens 204, a VIPA 206, a diffraction grating 210, a lens 212, and a mirror 214.

To more particularly describe the structure and function of the first preferred embodiment of the compensator 200, please refer to FIGS. 3 through 7b and the discussion below.

Figure 3:
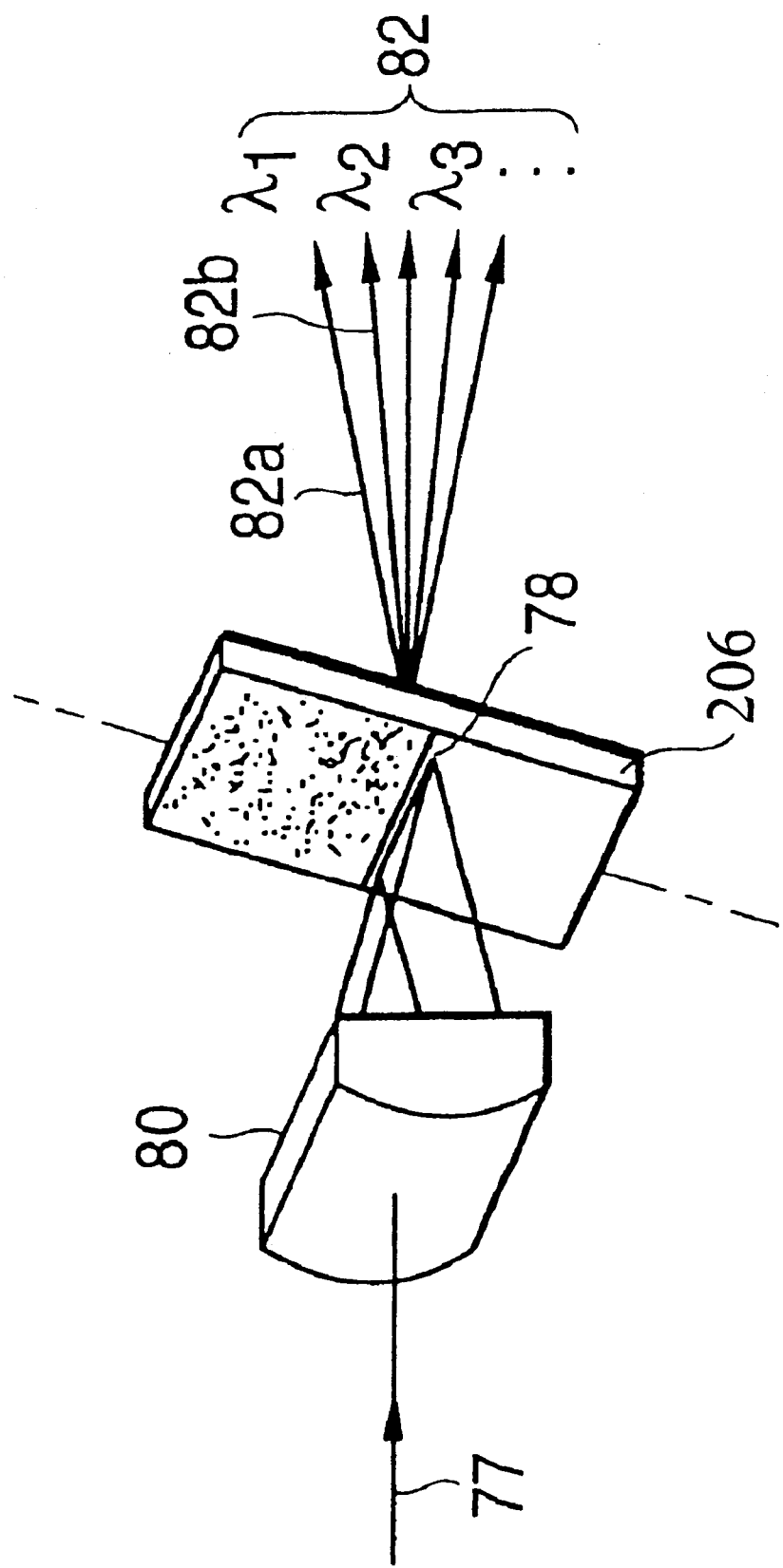
FIG. 3 illustrates a Virtually Imaged Phased Array (VIPA) of the first preferred embodiment of the chromatic dispersion and dispersion slope compensator in accordance with the present invention.

FIG. 3 illustrates a virtually imaged phased array of the first preferred embodiment of the chromatic dispersion and dispersion slope compensator in accordance with the present invention. The VIPA 206 is disclosed in U.S. Pat. No. 5,930,045, incorporated herein by reference. The VIPA 206 is preferably made of a thin plate of glass. An input light 77 is focused into a line 78 with a lens 80, such as a semi-cylindrical lens, so that input light 77 travels into VIPA 206. Line 78 is hereinafter referred to as the "focal line". Input light 77 radially propagates from focal line 78 to be received inside VIPA 206. The VIPA 206 then outputs a luminous flux 82 of collimated light, where the output angle of luminous flux 82 varies as the wavelength of input light 77 changes. For example, when input light 77 is at a wavelength $\lambda_1$, VIPA 206 outputs a luminous flux 82a at wavelength $\lambda_1$ in a specific direction. When input light 77 is at a wavelength $\lambda_2$, VIPA 206 outputs a luminous flux 82b at wavelength $\lambda_2$ in a different direction. Therefore, VIPA 206 produces luminous fluxes 82a and 82b that are spatially distinguishable from each other.

Figure 4:
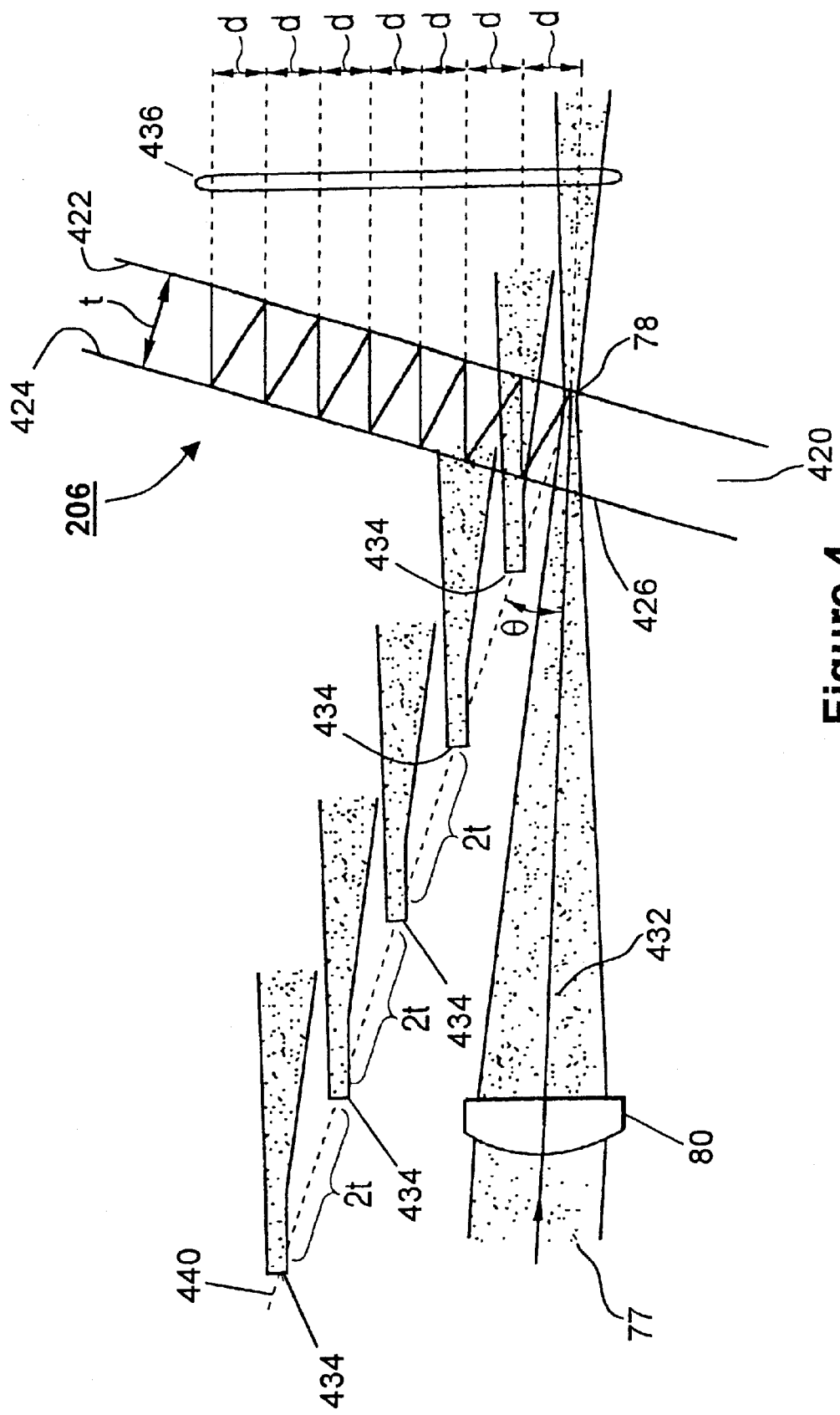
FIG. 4 illustrates in more details the light path through and operation of the VIPA of FIG. 3.

FIG. 4 illustrates in more detail the VIPA 206 and light paths therein and therethrough. The VIPA 206 includes a plate 420 made of, for example, glass, and having reflecting films 422 and 424 thereon. Reflecting film 422 preferably has a reflectance of approximately 95% or higher, but less than 100%. Reflecting film 424 preferably has a reflectance of approximately 100%. A radiation window 426 is formed on plate 420 and preferably has a reflectance of approximately 0% reflectance.

Input light 77 is focused into focal line 78 by lens 80 through radiation window 426, to subsequently undergo multiple reflection between reflecting films 422 and 424. Focal line 78 is preferably on the surface of plate 420 to which reflecting film 422 is applied. Thus, focal line 78 is essentially line focused onto reflecting film 422 through radiation window 426. The width of focal line 78 can be referred to as the "beam waist" of input light 77 as focused by lens 80. Thus, the VIPA 206 focuses the beam waist of input light 77 onto the far surface (that is, the surface having reflecting film 422 thereon) of plate 420. By focusing the beam waist on the far surface of plate 420, the VIPA 206 reduces the possibility of overlap between (i) the area of radiation window 426 on the surface of plate 420 covered by input light 77 as it travels through radiation window 426 and (ii) the area on reflecting film 424 covered by input light 77 when input light 77 is reflected for the first time by reflecting film 424. It is desirable to reduce such overlap to ensure proper operation of the VIPA 206.

In FIG. 4, an optical axis 432 of input light 77 has a small tilt angle θ with respect to a line 440 perpendicular to the plane of plate 420. Upon the first reflection off of reflecting film 422, 5% of the light passes through reflecting film 422 and diverges after the beam waist, and 95% of the light is reflected towards reflecting film 424. After being reflected by reflecting film 424 for the first time, the light again hits reflecting film 422 but is displaced by an amount d. Then, 5% of the light passes through reflecting film 422. In a similar manner, the light is split into many paths with a constant separation d. The beam shape in each path forms so that the light diverges from virtual images 434 of the beam waist. Virtual images 434 are located with constant spacing 2t along a line 440 that is normal to plate 420, where t is the thickness of plate 420. The positions of the beam waists in virtual images 434 are self-aligned, and there is no need to adjust individual positions. The lights diverging from virtual images 434 interfere with one another and form collimated light 436 which propagates in a direction that changes in accordance with the wavelength of input light 77.

The spacing of light paths is d=2t sin θ, and the difference in the path lengths between adjacent beams is 2t cos θ. The angular dispersion of the VIPA 206 is proportional to the ratio of these two numbers, which is cot θ. As a result, a VIPA 206 produces a significantly large angular dispersion.

Reflecting surfaces 422 and 424 are in parallel with each other and spaced by the thickness t of plate 420 and are typically reflecting films deposited on plate 420. As previously described, reflecting surface 424 has a reflectance of approximately 100%, except in radiation window 426, and reflecting surface 422 has a reflectance of approximately 95% or higher. Therefore, reflecting surface 422 has a transmittance of approximately 5% or less so that approximately 5% or less of light incident on reflecting surface 422 will be transmitted therethrough and approximately 95% or more of the light will be reflected. The reflectances of reflecting surfaces 422 and 424 can easily be changed in accordance with the specific VIPA application. However, generally, reflecting surface 422 should have a reflectance which is less than 100% so that a portion of incident light can be transmitted therethrough. This reflectance need not be constant along the reflecting film 422.

The reflecting surface 424 has radiation window 426 thereon. Radiation window 426 allows light to pass therethrough, and preferably has no reflectance, or a very low reflectance. Radiation window 426 receives input light 77 to allow input light 77 to be received between, and reflected between, reflecting surfaces 422 and 424.

A VIPA 206 has strengthening conditions which are characteristics of the design of the VIPA 206. The strengthening conditions increase the interference of the output lights so that a luminous flux is formed. The strengthening conditions of the VIPA are represented by the following equation:

$$2t \cos \Phi = m\lambda$$

in which $\Phi$ indicates the propagation direction of the resulting luminous flux as measured from a line perpendicular to the surface of reflecting surfaces 422 and 424, $\lambda$ indicates the wavelength of the input light, t indicates the distance between the reflecting surfaces 422 and 424, and m indicates an integer. Therefore, if t is constant and m is assigned a specific value, then the propagation direction $\Phi$ of the luminous flux formed for input light having wavelength $\lambda$ can be determined.

More specifically, input light 77 is radially dispersed from focal line 78 through a specific angle. Therefore, input light having the same wavelength will be traveling in many different directions from focal line 78, to be reflected between reflecting surfaces 422 and 424. The strengthening conditions of the VIPA 206 cause light traveling in a specific direction to be strengthened through interference of the output lights to form a luminous flux having a direction corresponding to the wavelength of the input light. Light traveling in a different direction than the specific direction required by the strengthening condition is weakened by the interference of the output lights.

Figure 5:
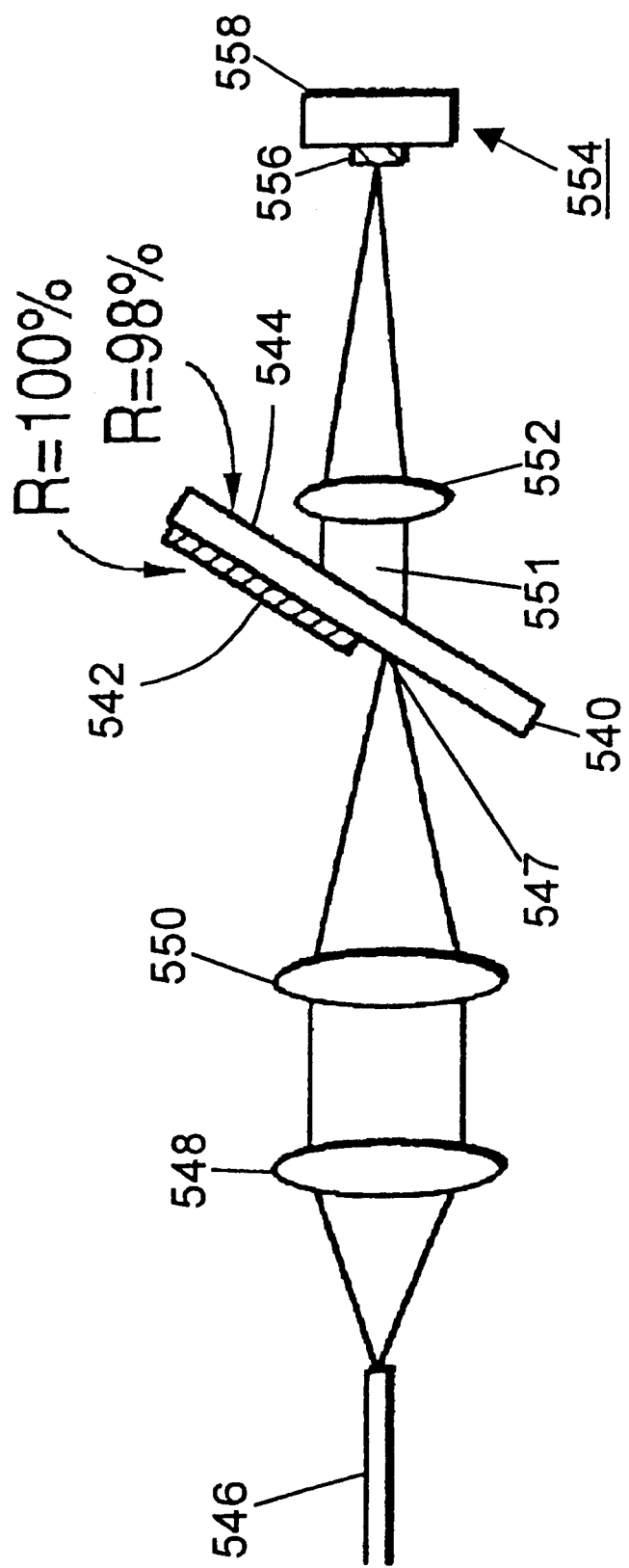
FIG. 5 illustrates an example prior-art apparatus which uses a VIPA and a light returning device to produce chromatic dispersion.

FIG. 5 illustrates an example prior-art apparatus that uses a VIPA as an angular dispersive component to produce chromatic dispersion. A description of this prior-art apparatus will assist in understanding how the first preferred embodiment of the compensator 200 (FIG. 2) in accordance with the present invention compensates for chromatic dispersion. As illustrated in FIG. 5, a light is output from a fiber 546, collimated by a collimating lens 548 and line-focused into VIPA 540 through radiation window 547 by a cylindrical lens 550. The VIPA 540 then produces a collimated light 551 which is focused by a focusing lens 552 onto a mirror 554. Mirror 554 can be a mirror portion 556 formed on a substrate 558. Mirror 554 reflects the light back through focusing lens 552 into VIPA 540. The light then undergoes multiple reflections in VIPA 540 and is output from radiation window 547. The light output from radiation window 547 travels through cylindrical lens 550 and collimating lens 548 and is received by fiber 546.

Therefore, light is output from VIPA 540 and reflected by mirror 554 back into VIPA 540. The light reflected by mirror 554 travels through the path which is substantially opposite in direction to the path through which it originally traveled. As described in greater detail herein following, different wavelength components in the light are focused onto different positions on mirror 554, and are reflected back to VIPA 540. As a result, different wavelength components travel different distances, to thereby produce chromatic dispersion.

Figure 6:
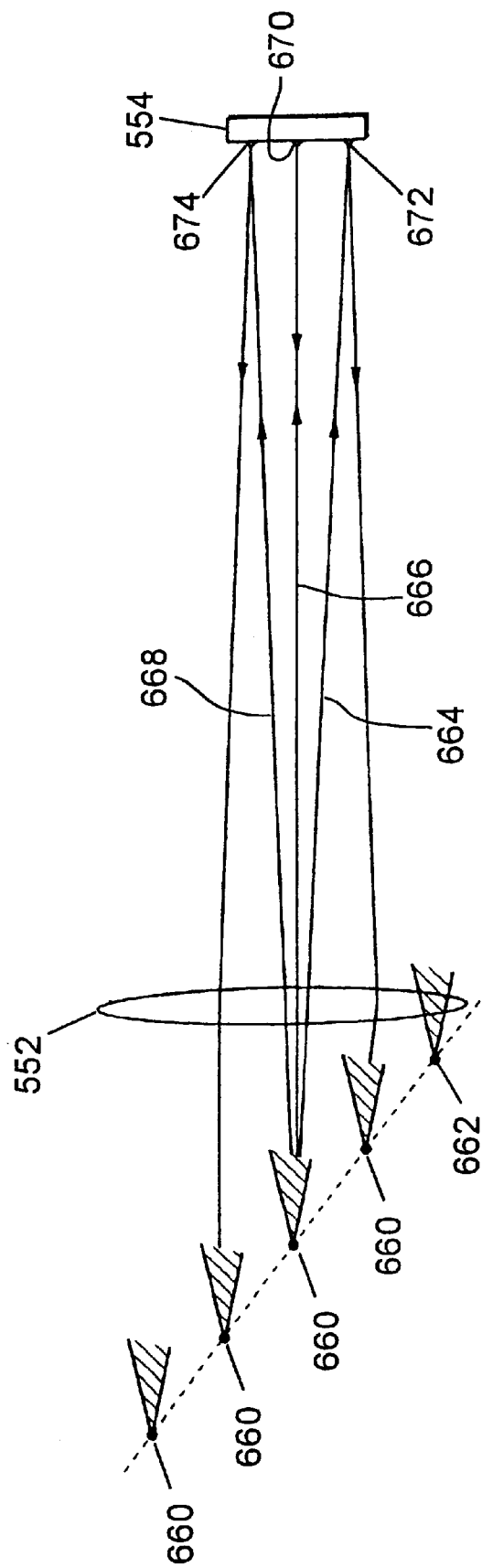
FIG. 6 illustrates in more detail the example apparatus illustrated in FIG. 5.

FIG. 6 illustrates in more detail the example prior-art apparatus illustrated in FIG. 5. Assume a light having various wavelength components is received by VIPA 540. The VIPA 540 will cause the formation of virtual images 660 of beam waist 662, where each virtual image 660 "emits" light. Focusing lens 552 focuses the different wavelength components in a collimated light from VIPA 540 at different points on mirror 554. More specifically, a longer wavelength 664 focuses at point 672, a center wavelength 666 focuses at point 670, and a shorter wavelength 668 focuses at point 674. Then, longer wavelength 664 returns to a virtual image 660 that is closer to beam waist 662, as compared to center wavelength 666. Shorter wavelength 668 returns to a virtual image 660 that is farther from beam waist 662, as compared to center wavelength 666. Thus, the arrangement provides for normal dispersion.

Mirror 554 is designed to reflect only light in a specific interference order, and light in any other interference order should be focused out of mirror 554. More specifically, as previously described, a VIPA 540 will output a collimated light. This collimated light will travel in a direction such that the optical path length difference between subsequent virtual images contributing to the collimated light is mλ, where m is an integer. The $m^{th}$ order of interference is defined as an output light corresponding to m. Each order comprises a plurality of wavelength components and the wavelength components of one order are repeated in any other order. However, collimated lights at the same wavelength for different interference orders generally travel in different directions and are therefore focused at different positions. Thus, the mirror 554 can be made to reflect only light from a single interference order back into VIPA 540.

A wavelength division multiplexed light usually includes many channels, wherein each channel has a center wavelength and the center wavelengths are usually spaced apart by a constant frequency spacing. If the thickness t between first and second surfaces 542 and 544 of VIPA 540 is set at a specific value, the arrangement will be able to simultaneously compensate for dispersion in each channel. The thickness t which permits such simultaneous dispersion compensation is such that all of the wavelength components corresponding to the center wavelengths of the respective channels have the same output angle from VIPA 540 and thus the same focusing position on mirror 554. This is possible when the thickness t is set so that, for each channel, the round-trip optical length through VIPA 540 traveled by the wavelength component corresponding to the center wavelength is a multiple of the center wavelength of each channel, that is, t is such that the quantity 2 nt cos θ is an integer multiple of the center wavelength of each channel. This amount of thickness t will hereafter be referred to as the "WDM matching free spectral range thickness", or "WDM matching FSR thickness".

Therefore, in FIGS. 5 and 6, with the thickness t set to the WDM matching FSR thickness, VIPA 540 and focusing lens 552 will cause (a) the wavelength component corresponding to the center wavelength of each channel to be focused at point 670 on mirror 554, (b) the wavelength component corresponding to the longer wavelength component of each channel to be focused at point 672 on mirror 554, and (c) the wavelength component corresponding to the shorter wavelength component of each channel to be focused at point 674 on mirror 554. Therefore, VIPA 540 can be used to compensate for chromatic dispersion in all channels of a wavelength division multiplexed light. However, this prior-art VIPA-based dispersion-compensating apparatus does not compensate for dispersion slope.

Figure 7A:
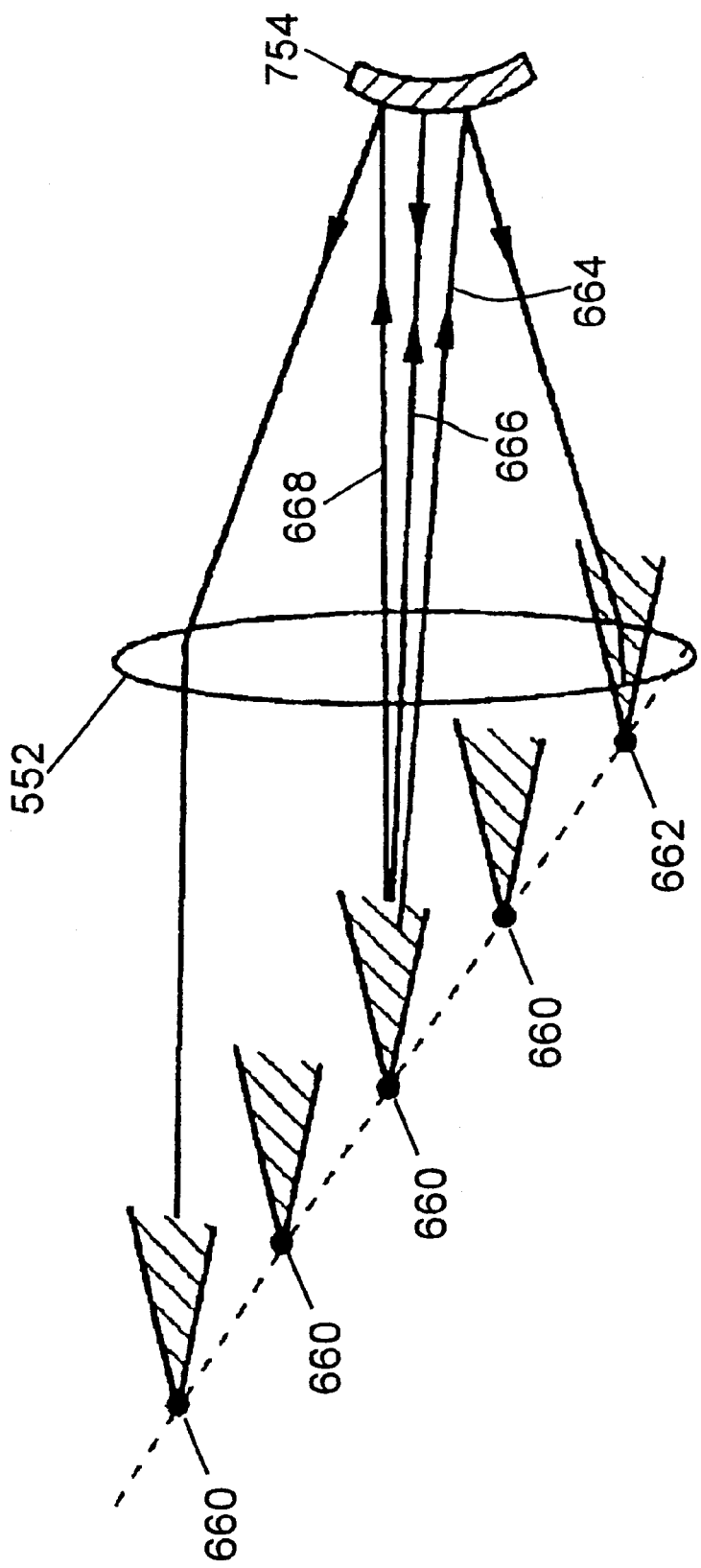
FIGS. 7a and 7b illustrates additional example prior-art apparatuses which uses a VIPA to provide chromatic dispersion to light.
Figure 7B:
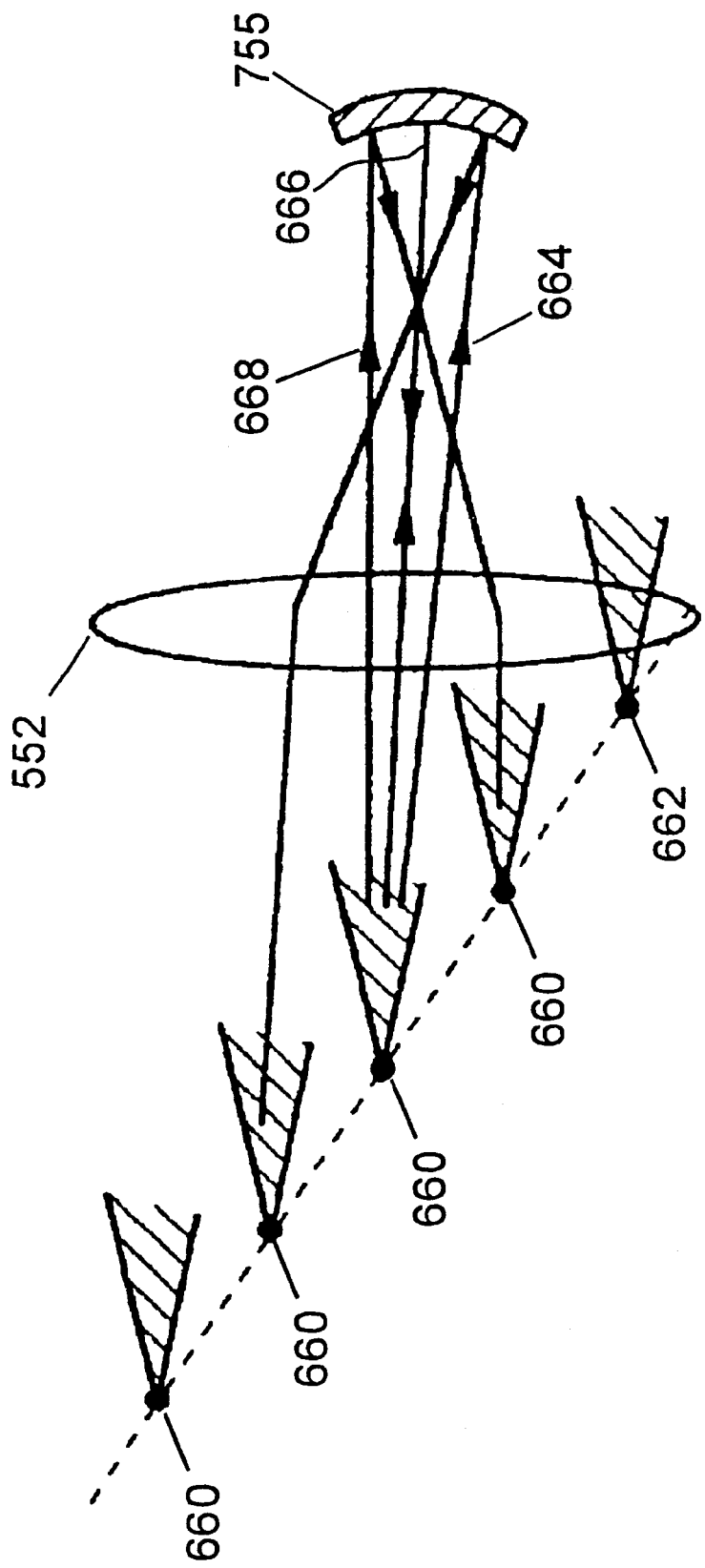

FIGS. 7a and 7b illustrate additional example prior-art apparatuses which use a VIPA to provide various values of chromatic dispersion to light. In FIGS. 7a and 7b, there are illustrated the travel directions of a longer wavelength 664, a center wavelength 666 and a shorter wavelength 668 of light emitted by a virtual image 660 of beam waist 662. The mirror 754 and the mirror 755 are located at or near the focal point of focusing lens 552. In FIG. 7a, mirror 754 is a convex mirror. With a convex mirror, the beam shift is magnified relative to that produced by a flat mirror (FIG. 6). Therefore, a large chromatic dispersion can be obtained with a short lens focal length and a small amount of space. In FIG. 7b, mirror 755 is a concave mirror. With a concave mirror, the sign of the dispersion is inverted relative to that produced by a flat mirror.

With either a flat mirror 554 (FIG. 6) or a convex mirror 754 (FIG. 7a), the light of longer ("red") wavelengths of an optical signal travels a shorter round trip distance through the apparatus then does the light of shorter ("blue") wavelengths of the signal. Thus, negative chromatic dispersion is introduced into the signal. This form of apparatus is useful for compensating accumulated positive chromatic dispersion in an optical signal. With a concave mirror 755 (FIG. 7b), the light of "red" wavelengths of an optical signal travels a greater distance through the apparatus then does the light of "blue" wavelengths of the signal and, thus, positive chromatic dispersion is introduced into the signal. This latter form of apparatus is useful for compensating accumulated negative chromatic dispersion in an optical signal.

Returning to FIGS. 2a and 2b, a wavelength-division multiplexed composite signal 201 is output from fiber 202, is collimated by collimator lens 203 and is then brought to a line focus at the beam waist 205 of VIPA 206 by the cylindrical lens 204. As discussed previously, the VIPA 206 spatially disperses the wavelengths comprising each one of the channels of composite signal 201, such that rays of each wavelength emanate from the VIPA 206 along ray paths which are parallel to one another but of a different direction than rays of any other wavelength comprising each channel. For instance, in FIG. 2b, ray paths 207a of a relatively longer wavelength and ray paths 207b of a relatively shorter wavelength of a first channel are illustrated by dashed and dotted lines, respectively. Because the thickness of VIPA 206 satisfies the WDM-matching FSR thickness, then, immediately upon output from VIPA 206, the paths 207a of the relatively longer wavelength of the first channel overlap those 208a of a relatively longer wavelength of a second channel. Likewise, the paths 207b of the relatively shorter wavelength of the first channel overlap those 208b of a relatively shorter wavelength of the second channel.

After being output from VIPA 206, the separated wavelengths are passed through a transmission grating 210. Upon passing through the transmission grating 210, the paths of the various signals are spatially dispersed from one another according to their respective wavelengths. The dispersion plane of transmission grating 210 is not parallel to that of the VIPA 206, however. Instead, these two dispersion planes are perpendicular to one another. Thus, as shown in FIG. 2a, the dispersion plane of transmission grating 210 is horizontal and, upon emerging from this grating, the wavelengths comprising the first channel are output along a different horizontal direction from those of the second channel. The path of the relatively longer wavelength 707a of the first channel is separated within a horizontal plane from that of the relatively longer wavelength 208a of the second channel. In similar fashion, the relatively shorter wavelengths 207b, 208b of each channel are spatially dispersed within a horizontal plane.

The spatially dispersed wavelengths 207a–207b of the first channel of composite optical signal 201 and the spatially separated wavelengths 208a–208b of the second channel of composite optical signal 201 are focused by lens 212 onto the surface of mirror 214. Because of the spatial dispersion within a horizontal plane by the transmission grating 210, each channel intercepts the mirror 214 at a different position within a horizontal plane. The mirror 214 (FIG. 2a) may comprise any one of a number of complex shapes. In the preferred embodiment, the mirror 214 has a shape that is approximately that of a cone with its long axis disposed horizontally. However, as shown in FIG. 2a, the cone axis 213 of mirror 214 is curved within a horizontal plane such that, at the focal point of each wavelength, the axis is substantially perpendicular to the propagation direction, as projected onto a horizontal plane, of the channel comprising that wavelength.

The mirror 214 reflects the light rays of each wavelength such that all such rays are directed back through lens 212 and are re-collimated by it. These reflected rays are not shown in FIGS. 2a–2b. In the first preferred embodiment, the curvature of the axis 213 of mirror 214 is such that the horizontal component of the path of the returning re-collimated rays of each wavelength is substantially parallel to the horizontal component of the path of the same rays prior to being focused by lens 212. In side view (FIG. 2b), the curvature of mirror 214 is similar to a simple convex mirror or concave mirror such that the relatively longer wavelengths 207a, 208a comprising each channel are reflected along different directions from the relatively shorter wavelengths 207b, 208b of each channel. In particular, the difference between the vertical directional component of the relatively longer wavelength and of the relatively shorter wavelength of each channel is such that the wavelengths are returned to different virtual images of the beam waist 205 of VIPA 206 as described previously. However, because of the approximate conical shape of mirror 214, each channel intercepts the mirror 214 at a region with a different curvature in vertical cross section. For instance, in top view (FIG. 7a), the light rays 207a–207b, comprising the first channel, intercept the mirror 214 at position 214a and those light rays 208a–208b comprising the second channel intercept the mirror at position 214b. However, in side view (FIG. 2b), the position 214a of mirror 214 comprises a greater degree of curvature than the position 214b.

In the top view (FIG. 2a), the reflected light of each wavelength that returns to the transmission grating 210 comprises an angle of incidence that is substantially equal to the diffraction angle of the light of the same wavelength upon passing through the grating the first time in the forward direction. Because of this situation, in the top view (FIG. 2a), the returning light of each and every wavelength is set substantially parallel to the axial dimension 209 of fiber 202 upon passing through transmission grating 210 for the second time.

In the side view (FIG. 2b), the relatively longer and relatively shorter wavelengths comprising each channel are returned to respective different virtual images of the beam waist 205 of VIPA 206 so as to comprise different optical path lengths through VIPA 206 and thereby acquire compensatory chromatic dispersion, as discussed previously. Since the light of the various channels are reflected from positions along mirror 214 with possibly different curvatures, the degree of compensatory chromatic dispersion can vary in a systematic fashion from channel to channel. The light of all wavelengths of all channels then propagates in the reverse direction through the VIPA 206 so as to be output from the beam waist 205. The light is then collimated by cylindrical lens 204 and refocused into the end face of fiber 202 by lens 203.

FIGS. 8a–8b illustrate a second preferred embodiment of a chromatic dispersion and dispersion slope compensator in accordance with the present invention. In the compensator 800, the fiber 202, collimator lens 203, cylindrical focusing lens 204 and VIPA 206 with beam waist 205 are common to the compensator 200 and are not described further. Also, the functioning of this set of components is similar to that in the first preferred embodiment of the compensator 200. That is, after emerging from VIPA 206, the light of composite optical signal 801 is spatially dispersed such that each of the wavelengths comprising each of the plurality of channels propagates in a different direction from the remaining wavelengths comprising the respective channel. The dispersion plane of VIPA 206 is vertical such that, as shown in FIG. 8b, the relatively longer wavelengths 807a, 808a of first and second channels, respectively, propagate with a different vertical directional component than that of the relatively shorter wavelengths 807b, 808b of the first and second channels, respectively.

In the chromatic dispersion and dispersion slope compensator 800, a pair of transmission gratings 810a–810b replaces the single transmission grating 210 of the compensator 200. In the second preferred embodiment, the two gratings 810a–810b are substantially identical to and parallel to one another. The effect of the two gratings 810a –810b is to spatially disperse the various channels according to their respective wavelengths, as previously described for the compensator 200. However, after passing through the two gratings 810a–810b in the compensator 800, the wavelengths of all channels emerge substantially parallel to one another, as projected onto a horizontal plane (FIG. 8a). FIG. 8a shows the pathways of the wavelengths 807a–807b of a first channel as dashed lines and the pathways of the wavelengths of a second channel 808a–808b as dotted lines. The horizontal separation between the channels may be controlled or "tuned" by adjusting the relative separation between the two gratings 810a–810b along the grating adjustment directions 820. In FIG. 8a, the paths of two channels are shown as partially overlapping in horizontal projection after emerging from the pair of gratings 810a–810b. However, the groove spacings of the gratings 810a–810b may be chosen and/or the gratings 810a–810b may be separated such that the channel paths do not overlap.

After emerging from the two gratings 810a–810b, the spatially separated wavelengths comprising the various channels of composite optical signal 801 are passed through the optional one-dimensional beam condenser 816, which comprises a pair of cylindrical lenses 817a–817b of different focal lengths. Because the lenses 817a–817b are cylindrical, collimated light inputted to either one is brought to a line focus (the "focal line"). In the compensator 800, the lenses 817a–817b are disposed such that their focal lines are contained within a single vertical plane that either contains or is parallel to the main axis 809 of the compensator 800. Because the lenses 817a–817b are both cylindrical and disposed in such a fashion, the optional beam condenser 816, functions so as to condense (or expand) the signal path separations only along a horizontal dimension perpendicular to the main axis 809. Along vertical projections, the relatively longer wavelengths 807a, 808a continue to diverge from the relatively shorter wavelengths 807b, 808b of the first and second channels, respectively. Although both lenses 817a–817b comprising the beam condenser 816 are shown as cylindrical converging lenses, one of ordinary skill in the art will readily recognize that these lenses may comprise a converging lens together with a diverging lens.

After passing through the one-dimensional beam condenser 816, the channels pass through a focusing lens 812 that focuses them onto a mirror 814. In the second preferred embodiment, the lens 812 is shown as a cylindrical lens with its focal lines disposed horizontally (that is, with focusing power along a vertical dimension) and perpendicular to the focal lines of lenses 817a–817b and to the channel light propagation direction. However, the lens 812 need not be a cylindrical lens.

Figure 8C:
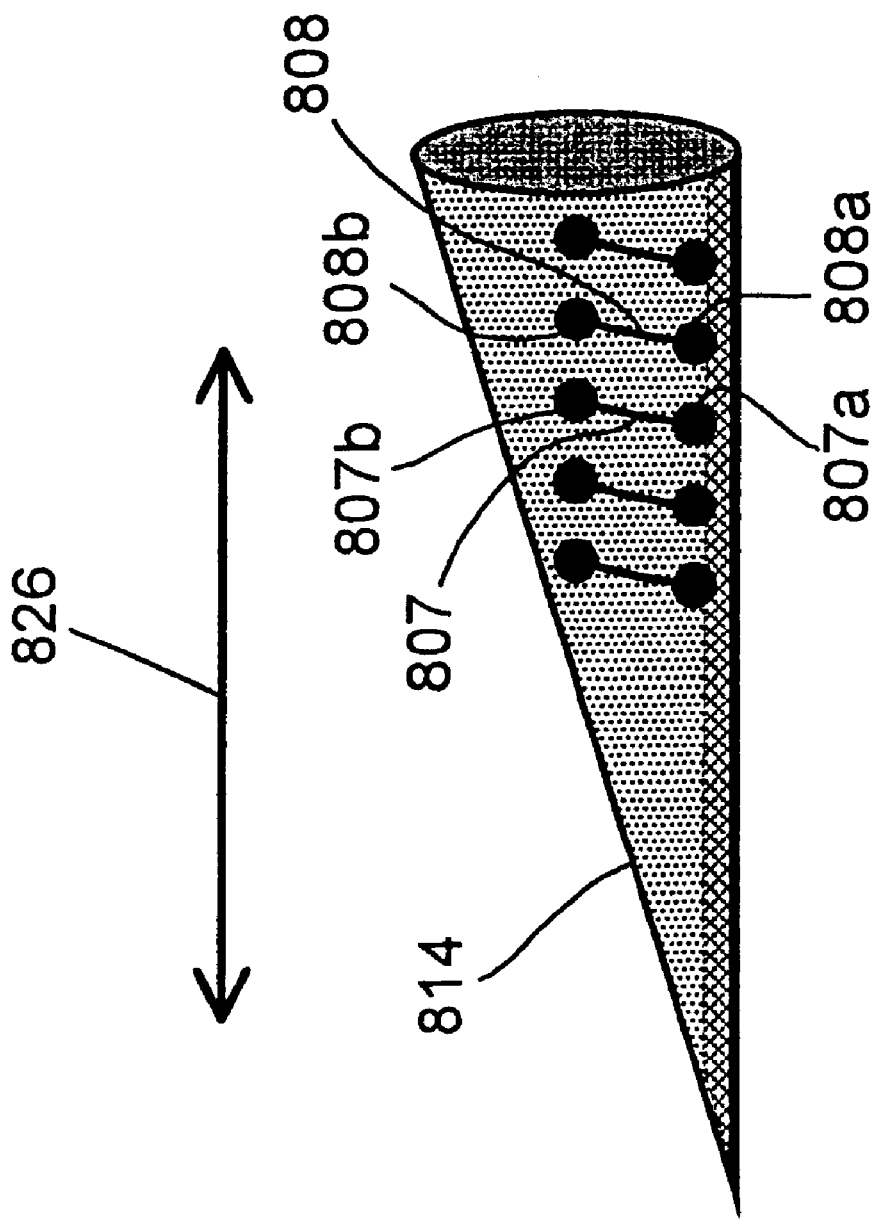
FIG. 8c illustrates the wavelengths of the channels of the composite optical signal as focused onto of the second preferred embodiment of the compensator in accordance with the present invention.

FIG. 8c illustrates the wavelengths of the channels of the composite optical signal as focused onto the mirror of the second preferred embodiment of the compensator in accordance with the present invention. In the second preferred embodiment, the mirror 814 has a conical shape with its axis disposed perpendicular to the long axis of the compensator 800. The relatively longer wavelength 807a is separated from the relatively shorter wavelength 807b of the first channel in the vertical dimension by virtue of the spatial dispersion of wavelengths by the VIPA 206. Likewise, the relatively longer wavelength 808a is separated from the relatively shorter wavelength 808b of the second channel in the vertical dimension. The remainder of the intermediate wavelengths comprising the first channel and the second channel lie along the curves joining the focal points of wavelengths 807a and 807b and joining the focal points of wavelengths 808a and 808b, respectively. The wavelengths comprising the first channel 807 are separated from those comprising the second channel 808 along a horizontal direction by virtue of the spatial dispersion of wavelengths by the gratings 810a–810b. Similarly, the wavelengths comprising a plurality of additional channels comprising composite optical signal 801 are focused along essentially parallel curves disposed to one side and/or the other side of the focal positions of the first 807 and second channel 808.

As illustrated in FIG. 8c, the channels are focused at positions along preferably conical mirror 814 having different radii of curvature in vertical cross sections. The horizontal distance between successive channels and, consequently, the degree of difference in mirror curvature at the focal positions of the channels is controlled or "tuned" by the separation adjustment of the two gratings 810a–810b along their adjustment direction 820 (FIG. 8a) or by adjustment of the lenses 817a–817b. As discussed previously in regards to chromatic dispersion compensator 200, the mirror 814 reflects the wavelengths comprising each and every channel so as to return, in the reverse direction, through all the optical components, i.e., the lens 812, the beam condenser 816, the gratings 810b and 810a, the VIPA 206, the cylindrical focusing lens 204 and the collimating lens 203, in this order. After passing through the collimating lens 203 in the return direction, the channels are focused into the end of fiber 202 so as to be output from the compensator 800.

In top view (FIG. 8a), the return pathway of each wavelength of each channel essentially overlaps with that of its forward propagation pathway. However, in side view (FIG. 8b), the relatively longer wavelength of each channel assumes a different vertical propagation component from the relatively shorter wavelength of the same channel. These different vertical components result from the original vertical dispersion during the forward pass of channels through VIPA 206 as well as from the curvature, in vertical cross sections, of the mirror 814. Furthermore, since each channel is focused upon mirror 814 at a position with a different curvature, the difference in vertical propagation component between the relatively longer and the relatively shorter wavelength of each respective channel varies systematically between and among the channels. As a result, the degree of compensatory chromatic dispersion introduced into each channel during propagation through VIPA 206 varies between and among the various channels. In this fashion the compensator 800 compensates both chromatic dispersion and chromatic dispersion slope introduced into signal channels as a result of their propagation through optical fiber.

Figure 9:
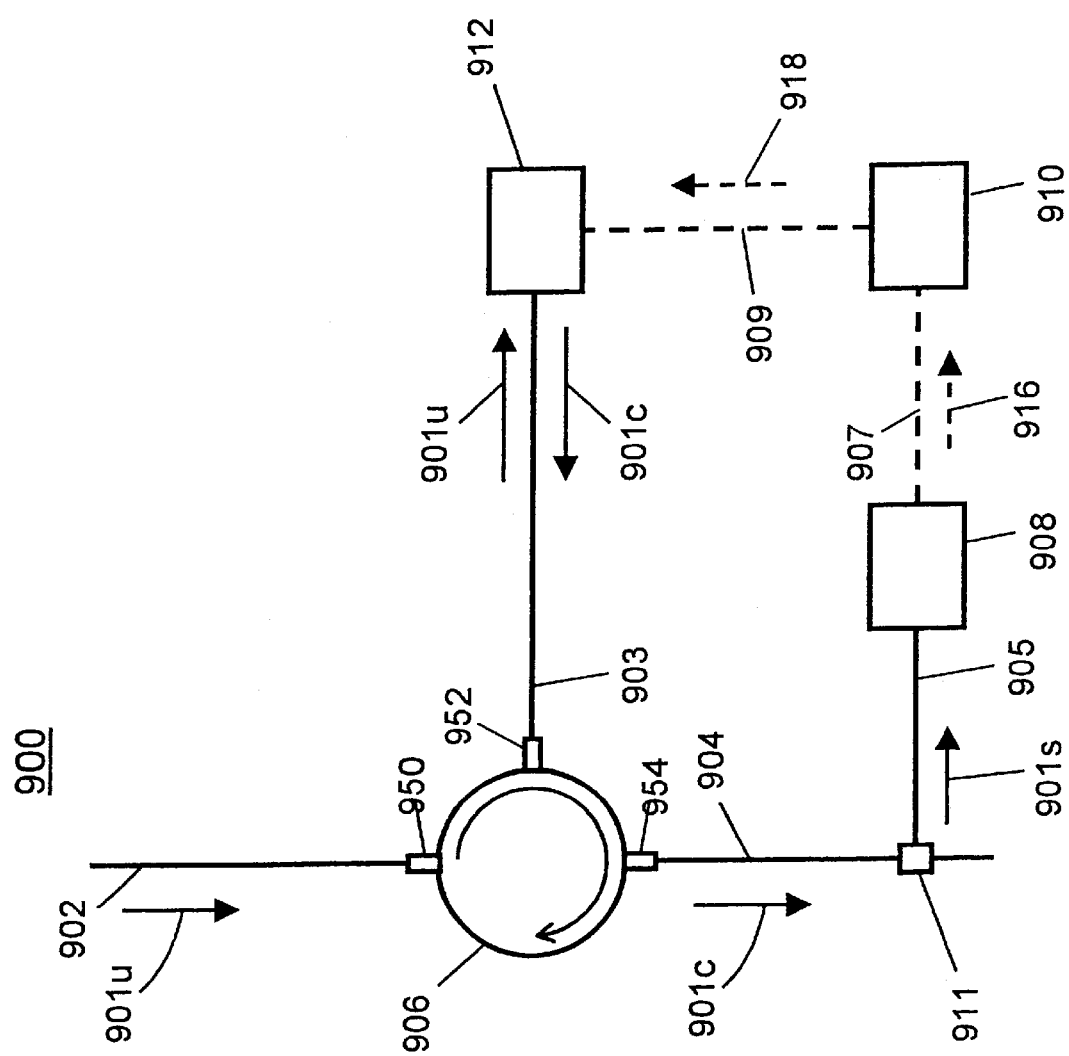
FIG. 9 illustrates a system for measurement and compensation of chromatic dispersion and dispersion slope in a signal or a composite optical signal utilizing the compensator in accordance with the present invention.

FIG. 9 illustrates a system for measurement and compensation of dispersion in a signal or a composite optical signal utilizing the compensator in accordance with the present invention. The system 900 comprises an input fiber optic line 902, an optical tap 911, a dispersion analyzer 908, a compensator controller 910, a dispersion compensator 912, an optical circulator 906 and an output fiber optic line 904. The input line 902 and output line 904 are optically coupled to the port 950 and to port 954 of circulator 906, respectively. The system further comprises a fiber optic tap line 905 optically coupling the optical tap 911 to the dispersion analyzer 908 and a fiber optic line 903 optically coupling the dispersion compensator 912 to port 952 of the circulator 906. The system further comprises first 907 and second 909 electronic signal or control lines respectively connected between the dispersion analyzer 908 and the controller 910 and between the controller 910 and the dispersion compensator 912.

An uncompensated optical signal or composite optical signal 901u is input to the system 900 via the input fiber optic line 902. The uncompensated signal 901u comprises unwanted chromatic dispersion that is to be compensated by the system 900. The uncompensated optical signal or composite signal 901u passes to port 950 of the optical circulator 906. The optical circulator 906 directs signal 901u to port 952, from which it is immediately output to the fiber optic line 903 and input to the dispersion compensator 912. In the preferred embodiment of the system, the dispersion compensator 912 comprises one of the compensators 200 or 800 in accordance with the present invention.

As described previously herein, the dispersion compensator 912 provides compensatory chromatic dispersion and chromatic dispersion slope, outputting a compensated signal or composite optical signal 901c along the optical fiber line 903 in the opposite direction from the input signal 901u. The compensated signal is then input to optical circulator 906 through port 952. By the well-known operation of optical circulators, the compensated signal 901c is directed to port 954 of optical circulator 906, from which it is immediately output to the output fiber optic line 904. A small portion 901s of the compensated output signal 901c is split off from signal 901c by the optical tap 911 and diverted to the dispersion analyzer via the fiber optic tap line 905.

The dispersion compensator 912 is controlled by electronic signal 918 output from controller 910 along electronic line 909. The controller 910 generates control signals in response to an electronic signal or signals 916 produced by dispersion analyzer 908 and sent to the controller 910 along electronic line 907. The dispersion analyzer may comprise known components to analyze chromatic dispersion, such as an optical spectrum analyzer. The electronic signal(s) 916 contains information measured by the dispersion analyzer 908 and pertaining to the magnitude and sign of chromatic dispersion carried by the sample signal 901s. In response to these measurements, the dispersion analyzer 908 outputs an electronic signal 916 to controller 910 along electronic line 907.

The amount of compensatory dispersion provided by dispersion compensator 912 is controlled by the electronic signal 918 output from the controller 910 in response to the dispersion characteristics measured by dispersion analyzer 908. If the dispersion compensator 912 comprises one of the embodiments of the present invention, adjusting one or more of the various optical components along its respective adjustment direction, as described previously herein, causes variation in the magnitude and sign of the compensatory dispersion.

A chromatic dispersion and dispersion slope compensator that utilizes a Virtually Imaged Phased Array (VIPA) and diffraction gratings has been disclosed. The compensator in accordance with the present invention provides simultaneous tunable compensation of chromatic dispersion and dispersion slope utilizing a single apparatus. A system which utilizes the compensator is thus cost effective to manufacture.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for dispersion compensation for a composite optical signal in an optical fiber transmission system, the composite optical signal comprising a plurality of channels, each of the plurality of channels comprising a band of wavelengths, wherein the bands of wavelengths comprises unwanted dispersion and dispersion slope, comprising the steps of:

(a) propagating the composite optical signal in a forward direction;

(b) separating the wavelengths in the band of wavelengths in each of the plurality of channels, wherein the each of the wavelengths in the band is spatially distinguishable from the other wavelengths in the band;

(c) spatially separating each band of wavelengths in the plurality of channels; and (d) reflecting the spatially separated bands of wavelengths toward a return direction, wherein dispersion is added to the reflected bands of wavelengths such that the unwanted dispersion and dispersion slope are compensated.

2. The method of claim 1, wherein the spatially separating step (c) further comprises:

(c1) compressing the spatially separated bands of wavelengths along a single dimension.

3. The method of claim 1, wherein in the reflecting step (d), each channel of the spatially separated bands of wavelengths intercepts a mirror at a different position.

4. The method of claim 3, wherein the mirror has a different curvature at each vertical cross-section.

5. A dispersion and dispersion slope compensator, comprising:

a Virtually Imaged Phased Array (VIPA) optically coupled to an optical fiber transmission system at a first side, wherein a composite optical signal from the optical fiber transmission system is capable of traversing through the VIPA in a forward direction, wherein the composite optical signal comprises a plurality of channels, each of the plurality of channels comprising a band of wavelengths, wherein the bands of wavelengths comprise unwanted dispersion and dispersion slope;

at least one diffraction grating, wherein a first side of the at least one diffraction grating is optically coupled to a second side of the VIPA;

a focusing lens, wherein a first side of the focusing lens is optically coupled to a second side of the at least one diffraction grating; and a mirror optically coupled to a second side of the focusing lens, wherein the mirror reflects the spatially separated bands of wavelengths toward a return direction, wherein the bands of wavelengths propagate through the focusing lens, the at least one diffraction grating, and the VIPA in the return direction, wherein dispersion is added to the reflected bands of wavelengths such that the unwanted dispersion and dispersion slope are compensated.

6. The compensator of claim 5, wherein the VIPA separates the wavelengths in a band of wavelengths in each of a plurality of channels, wherein each of the wavelengths in the band is spatially distinguishable from the other wavelengths in the band.

7. The compensator of claim 5, wherein the at least one diffraction grating spatially separates each band of wavelengths in the plurality of channels traversing through the at least one diffraction grating in the forward direction.

8. The compensator of claim 5, wherein the at least one diffraction grating comprises:

a first diffraction grating, wherein a first side of the first diffracting grating is optically coupled to the second side of the VIPA; and a second diffraction grating, wherein a first side of the second diffraction grating is optically coupled to a second side of the first diffraction grating, wherein a second side of the second diffraction grating is optically coupled to the first side of the focusing lens, wherein a distance between the first and second diffraction gratings is adjustable.

9. The compensator of claim 5, wherein the focusing leans is a cylindrical lens.

10. The compensator of claim 5, wherein the mirror has a different curvature at different cross-sections.

11. The compensator of claim 5, further comprising:

a beam condenser optically coupled between the at least one diffraction grating and the focusing leans.

12. The compensator of claim 11, wherein the beam condenser comprises:

a first lens, wherein a first side of the first lens is optically coupled to the second side of the at least one diffraction grating; and a second lens, wherein a first side of the second lens is optically coupled to a second side of the first lens, wherein a second side of the second lens is optically coupled to the first side of the focusing lens, wherein a focal length of the first lens is of a different length than a focal length of the second lens.

13. A chromatic dispersion and dispersion slope compensator, comprising:

a VIPA optically coupled to an optical fiber transmission system at a first side, wherein a composite optical signal from the optical fiber transmission system is capable of traversing through the VIPA in a forward direction, wherein the composite optical signal comprises a plurality of channels, each of the plurality of channels comprising a band of wavelengths, wherein the bands of wavelengths comprise unwanted chromatic dispersion and dispersion slope, wherein the VIPA separates the wavelengths in a band of wavelengths in each of a plurality of channels, wherein each of the wavelengths in the band is spatially distinguishable from the other wavelengths in the band;

a first diffraction grating, wherein a first side of the first diffracting grating is optically coupled to a second side of the VIPA;

a second diffraction grating, wherein a first side of the second diffraction grating is optically coupled to a second side of the first diffraction grating, wherein a distance between the first and second diffraction gratings is adjustable, wherein the first and second diffraction gratings spatially separate each band of wavelengths in the plurality of channels traversing through the first and second diffraction gratings in the forward direction;

a focusing lens, wherein a first side of the focusing lens is optically coupled to a second side of the second diffraction grating; and a mirror optically coupled to a second side of the focusing lens, wherein the mirror reflects the spatially separated bands of wavelengths toward a return direction, wherein the bands of wavelengths propagate through the focusing lens, the first and second diffraction gratings, and the VIPA in the return direction, wherein dispersion is added to the reflected bands of wavelengths such that the unwanted chromatic dispersion and dispersion slope are compensated.

14. A chromatic dispersion and dispersion slope compensator, comprising:

a VIPA optically coupled to an optical fiber transmission system at a first side, wherein a composite optical signal from the optical fiber transmission system is capable of traversing through the VIPA in a forward direction, wherein the composite optical signal comprises a plurality of channels, each of the plurality of channels comprising a band of wavelengths, wherein the bands of wavelengths comprise unwanted chromatic dispersion and dispersion slope, wherein the VIPA separates the wavelengths in a band of wavelengths in each of a plurality of channels, wherein each of the wavelengths in the band is spatially distinguishable from the other wavelengths in the band;

a first diffraction grating, wherein a first side of the first diffracting grating is optically coupled to a second side of the VIPA;

a second diffraction grating, wherein a first side of the second diffraction grating is optically coupled to a second side of the first diffraction grating, wherein a distance between the first and second diffraction gratings is adjustable, wherein the first and second diffraction gratings spatially separate each band of wavelengths in the plurality of channels traversing through the first and second diffraction gratings in the forward direction;

a beam condenser, wherein a first side of the beam condenser is optically coupled to a second side of the second diffraction grating;

a focusing lens, wherein a first side of the focusing lens is optically coupled to a second side of the beam condenser; and a mirror optically coupled to a second side of the focusing lens, wherein the mirror reflects the spatially separated bands of wavelengths toward a return direction, wherein the bands of wavelengths propagate through the focusing leans, the beam condenser, the first and second diffraction gratings, and the VIPA in the return direction, wherein dispersion is added to the reflected bands of wavelengths such that the unwanted chromatic dispersion and dispersion slope are compensated.

15. A system, comprising:

an optical fiber transmission system; and a chromatic dispersion compensator optically coupled to the optical fiber transmission system, the chromatic dispersion compensator comprising:

a VIPA optically coupled to the optical fiber transmission system at a first side, wherein a composite optical signal from the optical fiber transmission system is capable of traversing through the VIPA in a forward direction, wherein the composite optical signal comprises a plurality of channels, each of the plurality of channels comprising a band of wavelengths, wherein the bands of wavelengths comprise unwanted chromatic dispersion and dispersion slope;

at least one diffraction grating, wherein a first side of the at least one diffraction grating is optically coupled to a second side of the VIPA;

a focusing lens, wherein a first side of the focusing lens is optically coupled to a second side of the at least one diffraction grating; and a mirror optically coupled to a second side of the focusing lens, wherein the mirror reflects the spatially separated bands of wavelengths toward a return direction, wherein the bands of wavelengths propagate through the focusing lens, the at least one diffraction grating, and the VIPA in the return direction, wherein dispersion is added to the reflected bands of wavelengths such that the unwanted chromatic dispersion and dispersion slope are compensated.

16. The system of claim 15, wherein the VIPA separates the wavelengths in a band of wavelengths in each of a plurality of channels, wherein each of the wavelengths in the band is spatially distinguishable from the other wavelengths in the band.

17. The system of claim 15, wherein the at least one diffraction grating spatially separates each band of wavelengths in the plurality of channels traversing through the at least one diffraction grating in the forward direction.

18. The system of claim 15, wherein the at least one diffraction grating comprises:

a first diffraction grating, wherein a first side of the first diffraction grating is optically coupled to the second side of the VIPA; and a second diffraction grating, wherein a first side of the second diffraction grating is optically coupled to a second side of the first diffraction grating, wherein a second side of the second diffraction grating is optically coupled to the first side of the focusing lens, wherein a distance between the first and second diffraction gratings is adjustable.

19. The system of claim 15, wherein the focusing lens is a cylindrical lens.

20. The system of claim 15, wherein the mirror has a different curvature at different cross-sections.

21. The system of claim 15, further comprising:
a beam condenser optically coupled between the at least one diffraction grating and the focusing lens.

22. The system of claim 21, wherein the beam condenser comprises:
a first lens, wherein a first side of the first lens is optically coupled to the second side of the at least one diffraction grating; and
a second lens, wherein a first side of the second lens is optically coupled to a second side of the first lens, wherein a second side of the second lens is optically coupled to the first side of the focusing lens, wherein a focal length of the first lens is of a different length than a focal length of the second lens.

23. A system, comprising:
an optical fiber transmission system;
an optical circulator, wherein a first port and a third port of the optical circulator are optically coupled to the optical fiber transmission system; and
a chromatic dispersion compensator optically coupled to a second port of the optical circulator, the chromatic dispersion compensator comprising:
a VIPA optically coupled to the optical fiber transmission system at a first side, wherein a composite optical signal from the optical fiber transmission system is capable of traversing through the VIPA in a forward direction, wherein the composite optical signal comprises a plurality of channels, each of the plurality of channels comprising a band of wavelengths, wherein the bands of wavelengths comprise unwanted chromatic dispersion and dispersion slope;
at least one diffraction grating, wherein a first side of the at least one diffraction grating is optically coupled to a second side of the VIPA;
a focusing lens, wherein a first side of the focusing lens is optically coupled to a second side of the at least one diffraction grating; and
a mirror optically coupled to a second side of the focusing lens, wherein the mirror reflects the spatially separated bands of wavelengths toward a return direction, wherein the bands of wavelengths propagate through focusing lens, the at least one diffraction grating, and the VIPA in the return direction, wherein dispersion is added to the reflected bands of wavelengths such that the unwanted chromatic dispersion and dispersion slope are compensated.

24. The system of claim 23, wherein the VIPA separates the wavelengths in a band of wavelengths in each of a plurality of channels, wherein each of the wavelengths in the band is spatially distinguishable from the other wavelengths in the band.

25. The system of claim 23, wherein the at least one diffraction grating spatially separates each band of wavelengths in the plurality of channels traversing through the at least one diffraction grating in the forward direction.

26. The system of claim 23, wherein the at least one diffraction grating comprises:
a first diffraction grating, wherein a first side of the first diffraction grating is optically coupled to the second side of the VIPA; and
a second diffraction grating, wherein a first side of the second diffraction grating is optically coupled to a second side of the first diffraction grating, wherein a second side of the second diffraction grating is optically coupled to the first side of the focusing lens,
wherein a distance between the first and second diffraction gratings is adjustable.

27. The system of claim 23, wherein the focusing lens is a cylindrical lens.

28. The system of claim 23, wherein the mirror has a different curvature at different vertical cross-sections.

29. The system of claim 23, further comprising:
a beam condenser optically coupled between the at least one diffraction grating and the focusing lens.

30. The system of claim 29, wherein the beam condenser comprises:
a first lens, wherein a first side of the first lens is optically coupled to the second side of the at least one diffraction grating; and
a second lens, wherein a first side of the second lens is optically coupled to a second side of the first lens, wherein a second side of the second lens is optically coupled to the first side of the focusing lens, wherein a focal length of the first lens is of a different length than a focal length of the second lens.

31. The system of claim 23, further comprising:
an optical tap optically coupled to the optical fiber transmission system;
a dispersion analyzer, wherein a first side of the dispersion analyzer is optically coupled to the optical tap; and
a compensator controller, wherein the compensator controller is coupled to the dispersion analyzer and the dispersion compensator.

32. A system, comprising:
a chromatic dispersion compensator; and
a composite optical signal traversing through the chromatic dispersion compensator, wherein the composite optical signal comprises a plurality of channels, each of the plurality of channels comprising a band of wavelengths, wherein the bands of wavelengths comprises unwanted chromatic dispersion and dispersion slope,
wherein the composite optical signal is propagated in a forward direction,
wherein the wavelengths in the band of wavelengths in each of the plurality of channels are separated wherein the each of the wavelengths in the band is spatially distinguishable from the other wavelengths in the band,
wherein each band of wavelengths in the plurality of channels is spatially separated, and
wherein the spatially separated bands of wavelengths are reflected toward a return direction wherein dispersion is added to the reflected bands of wavelengths such that the unwanted chromatic dispersion and dispersion slope are compensated.

33. A system, comprising:
means for propagating a composite optical signal in a forward direction;
means for separating wavelengths in a band of wavelengths in each of a plurality of channels, wherein each of the wavelengths in the band is spatially distinguishable from the other wavelengths in the band;
means for spatially separating each band of wavelengths in the plurality of channels; and
means for reflecting the spatially separated bands of wavelengths toward a return direction, wherein the bands of wavelengths propagate through the separating means and the spatially separating means, wherein dispersion is added to the reflected bands of wavelengths such that the unwanted chromatic dispersion and dispersion slope are compensated.

* * * * *